United States Patent
Wabe et al.

(10) Patent No.: US 10,097,669 B2
(45) Date of Patent: Oct. 9, 2018

(54) INFORMATION PROCESSING SYSTEM, INFORMATION PROCESSING DEVICE, INFORMATION PROCESSING METHOD, AND STORAGE MEDIUM HAVING STORED THEREIN COMPUTER PROGRAM

(71) Applicant: NINTENDO CO., LTD., Kyoto (JP)

(72) Inventors: Kazuhiro Wabe, Kyoto (JP); Masaki Shikata, Kyoto (JP); Eiji Tokunaga, Kyoto (JP); Hitoshi Sakai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 669 days.

(21) Appl. No.: 13/800,278

(22) Filed: Mar. 13, 2013

(65) Prior Publication Data

US 2014/0143303 A1    May 22, 2014

(30) Foreign Application Priority Data

Nov. 16, 2012 (JP) ................. 2012-251965

(51) Int. Cl.
*G06F 15/16* (2006.01)
*H04L 29/06* (2006.01)
*G06F 17/30* (2006.01)
*G06Q 30/06* (2012.01)

(52) U.S. Cl.
CPC ........ *H04L 67/42* (2013.01); *G06F 17/30905* (2013.01); *G06Q 30/0641* (2013.01)

(58) Field of Classification Search
CPC ....... H04W 4/003; H04W 4/008; H04W 4/16; G06Q 20/12; G06Q 20/36; G06Q 20/20; G06F 21/00; G06F 21/56; G06F 8/34; G06F 8/52; G06F 8/60; H04L 63/20; H04L 63/101; H04L 63/1433

USPC .......... 709/203; 715/808, 810, 838
See application file for complete search history.

(56) References Cited

U.S. PATENT DOCUMENTS

| | | | |
|---|---|---|---|
| 6,005,973 | A | 12/1999 | Seybold et al. |
| 6,716,103 | B1 | 4/2004 | Eck |
| 6,900,807 | B1 | 5/2005 | Liongosari et al. |
| 6,904,449 | B1 | 6/2005 | Quinones |
| 7,512,655 | B2 | 3/2009 | Armstrong et al. |

(Continued)

FOREIGN PATENT DOCUMENTS

| | | |
|---|---|---|
| EP | 2 584 756 | 4/2013 |
| JP | 2002-066144 | 3/2002 |

(Continued)

OTHER PUBLICATIONS

Office Action issued in U.S. Appl. No. 13/750,473, dated Sep. 8, 2015, 31 pages.

(Continued)

*Primary Examiner* — Larry Donaghue
*Assistant Examiner* — Patrick Ngankam
(74) *Attorney, Agent, or Firm* — Nixon & Vanderhye P.C.

(57) ABSTRACT

When it is detected that a home button is pressed while an application is being executed, execution of the application is suspended and a home button menu is displayed on a display device. Then, when execution of shop software is started, the shop software obtains application identification information of the active application via system software, accesses a shop server based on the application identification information, and displays a page related to the active application on the display device.

22 Claims, 7 Drawing Sheets

(56) References Cited

U.S. PATENT DOCUMENTS

| | | | |
|---|---|---|---|
| 7,742,585 B2* | 6/2010 | Otaka | H04M 1/72583 |
| | | | 379/201.1 |
| 7,814,225 B2 | 10/2010 | Rumelhart | |
| 7,894,836 B1 | 2/2011 | Fuoss et al. | |
| 8,166,026 B1 | 4/2012 | Sadler | |
| 8,311,382 B1 | 11/2012 | Harwell et al. | |
| 8,347,381 B1 | 1/2013 | Gauvin | |
| 8,715,091 B1 | 5/2014 | Hashimoto et al. | |
| 2002/0059379 A1 | 5/2002 | Harvey et al. | |
| 2002/0094069 A1 | 7/2002 | Takahashi et al. | |
| 2003/0077559 A1 | 4/2003 | Braunberger | |
| 2004/0176170 A1 | 9/2004 | Eck et al. | |
| 2005/0003850 A1* | 1/2005 | Tsuda | H04M 1/72522 |
| | | | 455/550.1 |
| 2005/0144032 A1 | 6/2005 | Shimoda et al. | |
| 2006/0080702 A1 | 4/2006 | Diez et al. | |
| 2006/0160622 A1* | 7/2006 | Lee | G07F 17/323 |
| | | | 463/42 |
| 2006/0173929 A1 | 8/2006 | Wilson | |
| 2006/0184617 A1 | 8/2006 | Nicholas et al. | |
| 2006/0232795 A1* | 10/2006 | Tsuboi et al. | 358/1.2 |
| 2007/0130150 A1 | 6/2007 | Fowler et al. | |
| 2007/0191097 A1 | 8/2007 | Johnson | |
| 2007/0244987 A1 | 10/2007 | Pedersen et al. | |
| 2007/0265972 A1 | 11/2007 | Tsutsui | |
| 2008/0052634 A1 | 2/2008 | Fishkin et al. | |
| 2008/0119281 A1 | 5/2008 | Hirose et al. | |
| 2009/0150486 A1 | 6/2009 | Franco et al. | |
| 2009/0164595 A1 | 6/2009 | Shiigi | |
| 2009/0199097 A1 | 8/2009 | Black et al. | |
| 2009/0209337 A1 | 8/2009 | Vrignaud et al. | |
| 2009/0222811 A1 | 9/2009 | Faus et al. | |
| 2009/0232141 A1 | 9/2009 | Fersman et al. | |
| 2009/0248804 A1 | 10/2009 | Ohtani | |
| 2009/0265427 A1 | 10/2009 | Ankireddyapalli | |
| 2010/0009747 A1* | 1/2010 | Reville | A63F 13/12 |
| | | | 463/31 |
| 2010/0035692 A1 | 2/2010 | Reville et al. | |
| 2010/0241580 A1 | 9/2010 | Schleier-Smith | |
| 2010/0293221 A1 | 11/2010 | Sidman et al. | |
| 2011/0055821 A1 | 3/2011 | Tanaka et al. | |
| 2011/0060797 A1 | 3/2011 | Balandin et al. | |
| 2011/0107382 A1 | 5/2011 | Morris | |
| 2011/0231488 A1 | 9/2011 | Xu | |
| 2011/0237332 A1 | 9/2011 | Abiko | |
| 2011/0252006 A1 | 10/2011 | Smith et al. | |
| 2012/0072871 A1* | 3/2012 | Seo | H04N 5/445 |
| | | | 715/838 |
| 2012/0136959 A1 | 5/2012 | Kadam et al. | |
| 2012/0166968 A1 | 6/2012 | Lee et al. | |
| 2012/0178536 A1 | 7/2012 | Oh et al. | |
| 2012/0192170 A1* | 7/2012 | Kobayashi | G06F 8/65 |
| | | | 717/168 |
| 2012/0221639 A1 | 8/2012 | Mallet | |
| 2012/0304106 A1 | 11/2012 | Levee | |
| 2013/0144956 A1 | 6/2013 | Sakai | |
| 2013/0212526 A1* | 8/2013 | Park | G06F 9/451 |
| | | | 715/808 |
| 2013/0325925 A1 | 12/2013 | Mizuki et al. | |
| 2013/0325957 A1 | 12/2013 | Mizuki et al. | |
| 2013/0326011 A1 | 12/2013 | Mizuki et al. | |
| 2014/0019347 A1 | 1/2014 | Dimaggio | |
| 2015/0249700 A1 | 9/2015 | Mizuki et al. | |
| 2015/0334145 A1 | 11/2015 | Jayaram | |
| 2016/0006834 A1 | 1/2016 | Mizuki et al. | |

FOREIGN PATENT DOCUMENTS

| | | |
|---|---|---|
| JP | 2002-259285 | 9/2002 |
| JP | 2009-519505 | 5/2009 |
| JP | 2010-046159 | 3/2010 |
| JP | 2011-53817 | 3/2011 |
| JP | 2011-200437 | 10/2011 |
| JP | 2012-034337 | 2/2012 |
| JP | 2012-053867 | 3/2012 |
| JP | 2012-155406 | 8/2012 |

OTHER PUBLICATIONS

Office Action issued in U.S. Appl. No. 13/750,473, dated Jan. 11, 2016, 40 pages.
Office Action issued in U.S. Appl. No. 13/764,102, dated Jan. 4, 2016, 21 pages.
Office Action dated Dec. 19, 2016, issued in U.S. Appl. No. 13/771,824 (48 pages).
Office Action issued in U.S. Appl. No. 13/768,793 dated Feb. 27, 2015, 14 pages.
Office Action issued in U.S. Appl. No. 13/750,473 dated Feb. 12, 2015, 45 pages.
Extended European Search Report issued in European Application No. EP 13152457 dated Sep. 27, 2013, 6 pages.
Home page, Wikipedia, en.wikipedia.org, May 30, 2012, XP055079714, 1 page.
User agent, Wikipedia, en.wikipedia.org, May 2, 2012, XP055079716, 5 pages.
"Xbox Live Connects You" (JP language), http://www.xbox.com/ja-JP/live/stayconnected,1 page, retrieved Jan. 9, 2013.
"Xbox Live Connects You" (English language), http://www.xbox.com/en-US/live/stay-connected, 2 pages retrieved Jan. 9, 2013.
"Xbox Live Connects You" http://www.xbox.com/ja-JP/live-stayconnected, and its English counterpart, 3 pages.
European Search Report issued in European Application No. EP 13155579.9 dated Sep. 20, 2013, 7 pages.
Office Action issued in U.S. Appl. No. 13/768,793 dated Jan. 31, 2014, 17 pages.
Office Action issued in U.S. Appl. No. 13/768,793 dated Aug. 15, 2014, 12 pages.
Office Action issued in U.S. Appl. No. 13/768,793 dated May 9, 2013, 12 pages.
Office Action issued in U.S. Appl. No. 13/764,102, dated Jan. 30, 2015, 17 pages.
U.S. Appl. No. 13/750,473, filed Jan. 25, 2013, Posted Information Sharing System, Information-Processsing System, Information Processing Method, Storage Medium, and Computer Platform.
U.S. Appl. No. 13/764,102, filed Feb. 11, 2013, Information-Processing System, Information-Processing Device, Storage Medium, and Information-Processing Method.
U.S. Appl. No. 13/768,793, filed Feb. 15, 2013, Posted Information Sharing, (issued as U.S. Pat. No. 9,185,187).
U.S. Appl. No. 14/715,083, filed May 18, 2015, Posted Information Sharing System, Information-Processing System, Information Processing Method, Storage Medium, and Computer Platform.
U.S. Appl. No. 14/852,181, filed Sep. 11, 2015, Posted Information Sharing System, Information-Processing System, Information Processing Method, Storage Medium, and Computer Platform.
Japanese Notice of Reasons for Refusal and its English translation for corresponding Japanese Application No. 2012-251965, dated Aug. 18, 2016 (10 pages).
Kataoka "Chapter 3 Mastering PlayStation Store" in "Smart guide for starting to learn PS Vita from scratch" Gijutsu-Hyohron Co., Ltd., first version, pp. 73-98 (Apr. 10, 2012).
Musoublog "Introduction of a way to purchase shin sangokumuso 6 DLC weapon 'Senka' etc.!" Shin·muso Blog, Internet Archive, Oct. 4, 2011, searched on Aug. 15, 2016 <URL:https://web.archive.org/web/20111004082520/http://musou.ldblog.jp/archives/1919565.html>.
Office Action dated Oct. 4, 2016, issued in U.S. Appl. No. 13/764,102.
Office Action dated Jul. 27, 2016, issued in U.S. Appl. No. 13/750,473.
Office Action dated May 18, 2017, issued in U.S. Appl. No. 13/764,102 (27 pages).
Office Action dated Jun. 1, 2017, issued in U.S. Appl. No. 13/750,473 (73 pages).
Communication Pursuant to Article 94(3) EPC dated Feb. 21, 2018, issued in European Patent Application No. 13 155 579.9.

(56) References Cited

OTHER PUBLICATIONS

Advisory Action dated Apr. 9, 2018, issued in U.S. Appl. No. 13/750,473.
Berners-Lee et al. "The world-wide web", Computer Networks and ISDN Systems 25:454-459 XP2666042 (1992).
Office Action for European Application No. 13158981.4, eight pages, dated Nov. 6, 2017.
Office Action dated Oct. 5, 2017, issued in U.S. Appl. No. 14/715,083.
Office Action dated Jan. 5, 2018, issued in U.S. Appl. No. 13/750,473.
Notice of Allowance dated Sep. 22, 2017, issued in U.S. Appl. No. 13/764,102.
Office Action dated Nov. 30, 2017, issued in U.S. Appl. No. 14,852,181.
Office Action dated Jan. 11, 2018, issued in U.S. Appl. No. 13/771,824.
Office Action dated Jun. 30, 2017, issued in U.S. Appl. No. 13/771,824.
"To start Nintendo eShop?", http://www.nintendo.co.jp/3ds/eshop/howto/index.html, and the English translation thereof, 4 pages.

* cited by examiner

F I G. 1
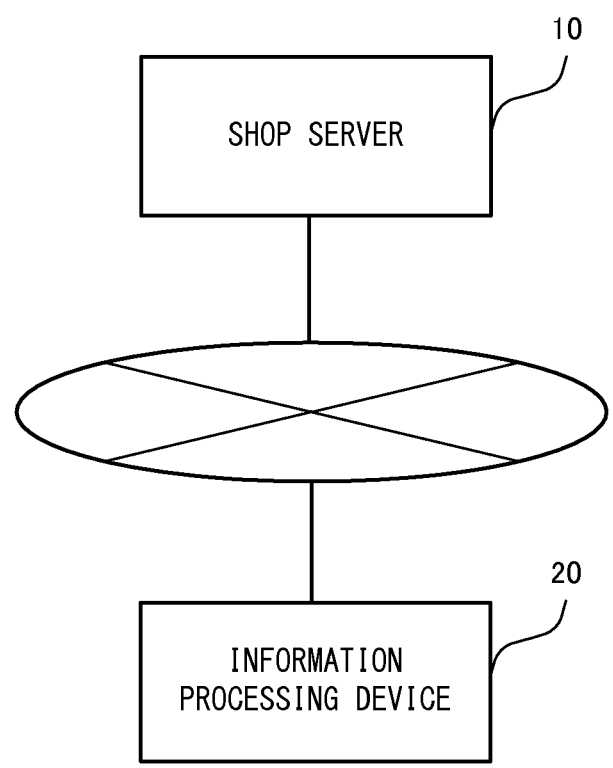

INFORMATION PROCESSING SYSTEM, INFORMATION PROCESSING DEVICE, INFORMATION PROCESSING METHOD, AND STORAGE MEDIUM HAVING STORED THEREIN COMPUTER PROGRAM

CROSS REFERENCE TO RELATED APPLICATION

The disclosures of Japanese Patent Application No. 2012-251965, filed on Nov. 16, 2012, are incorporated herein by reference.

FIELD

The present technology relates to an information processing system, an information processing device, an information processing method, and a storage medium having stored therein a computer program, and particularly relates to an information processing system, an information processing device, an information processing method and a storage medium having stored therein a computer program, for downloading application related data of various applications.

BACKGROUND AND SUMMARY

Conventionally, there are known game apparatuses which display a menu after start up, and when a predetermined icon is selected from the menu, access a server apparatus on the internet to allow a user to purchase and download a piece of game software and the like.

However, in the above described prior art, in order to download or purchase a desired piece of game software and the like, the user first needs to select a predetermined icon from the menu and then search for a page for purchasing or downloading the piece of game software and the like.

Thus, there is a demand for allowing the user to easily download application related data of an application, thereby improving convenience of the user.

The above objective can be attained by, for example, following configurations.

A first exemplary configuration is an information processing system including an application execution unit, an access unit, and an active application identification information obtaining unit. The application execution unit executes various applications. The access unit accesses a network service for downloading application related data of each of the various applications. The active application identification information obtaining unit obtains active application identification information representing an application being executed or being suspended by the application execution unit. The access unit performs a process in accordance with the active application identification information obtained by the active application identification information obtaining unit.

The access unit may be able to access the network service regardless of type of the application being executed or being suspended by the application execution unit.

The information processing system may include an information processing device which operates in accordance with system software. The active application identification information obtaining unit may use a function provided by the system software to obtain the active application identification information.

The information processing system may further include a page specification unit which specifies, based on the active application identification information obtained by the active application identification information obtaining unit, a page for downloading the application related data of the application represented by the identification information from the network service. The access unit may display the page specified by the page specification unit.

When the access unit accesses the network service, the access unit may obtain the active application identification information and display the page specified by the page specification unit.

The network service may provide a page group including a plurality of pages, for downloading the application related data, corresponding to the various applications, respectively, and a selection page for selecting a desired page from the page group including the plurality of pages. The access unit may be able to display the selection page, select any page from among the page group including the plurality of pages on the selection page based on a user input, and display the selected page.

When there is no application being executed or being suspended by the application execution unit when the access unit accesses the network service, the access unit may display the selection page.

The information processing system may further include an execution control unit which suspends execution of the application by the application execution unit in response to detection of a particular operation by a user, and thereafter resumes the execution of the application by the application execution unit when a predetermined condition is satisfied.

The particular operation may be an operation for displaying a menu screen which includes a command for accessing the network service. The access unit may access the network service when the access command has been issued by the user from the menu screen.

The particular operation may be an operation which is received regardless of type of the application executed by the application execution unit.

The particular operation may be an operation which is not used for the execution of the application by the application execution unit.

When the process in accordance with the active application identification information has been ended while a certain application is being executed or being suspended, the application execution unit may maintain or resume execution of the application.

The information processing system may further include a download control unit which downloads, from the network service, the application related data designated by a user based on the page specified by the page specification unit.

Even if an application is being executed by the application execution unit, the download control unit may download, from the network service, the application related data in parallel with execution of the application.

A second exemplary configuration is an information processing device including an application execution unit, an access unit, and an active application identification information obtaining unit. The application execution unit executes various applications. The access unit accesses a network service for downloading application related data of each of the various applications. The active application identification information obtaining unit obtains active application identification information representing an application being executed or being suspended by the application execution unit. The access unit performs a process in accordance with the active application identification information obtained by the active application identification information obtaining unit.

A third exemplary configuration is an information processing method performed in an information processing system. The information processing system accesses a network service for downloading application related data of each of various applications. The information processing system obtains active application identification information representing an application being executed or being suspended. The information processing system performs a process in accordance with the active application identification information having been obtained.

A fourth exemplary configuration is a storage medium having stored therein a computer program which causes a computer of an information processing system to: access a network service; and obtain active application identification information. That is, the computer accesses the network service for downloading application related data of each of various applications. The computer obtains the active application identification information representing an application being executed or being suspended. A process is performed in accordance with the active application identification information having been obtained.

The computer program may be stored in any computer-readable storage medium such as a CD, a DVD, or the like.

According to the information processing system, the information processing device, the information processing method, and the storage medium, a process is performed by the access unit in accordance with an application being executed or being suspended. Consequently, convenience of a user is improved.

These and other objects, features, aspects and advantages will become more apparent from the following detailed description when taken in conjunction with the accompanying drawings.

BRIEF DESCRIPTION OF THE DRAWINGS

FIG. 1 shows a non-limiting example of an overall configuration of a system;

DETAILED DESCRIPTION OF NON-LIMITING EXAMPLE EMBODIMENTS

Hereinafter, an exemplary embodiment will be described with reference to the drawings.

In FIG. 1, an information processing device 20 is an information processing device having a communication function and is, for example, a game apparatus.

A shop server 10 is a server apparatus which provides a network service for allowing a user to purchase application software (may be referred to simply as "application" in the following description) and to download an additional content (e.g., additional character data, additional stage data, and the like) used in the application to the information processing device 20.

Next, an internal configuration of the information processing device 20 will be described with reference to FIG. 2.

Figure 2:
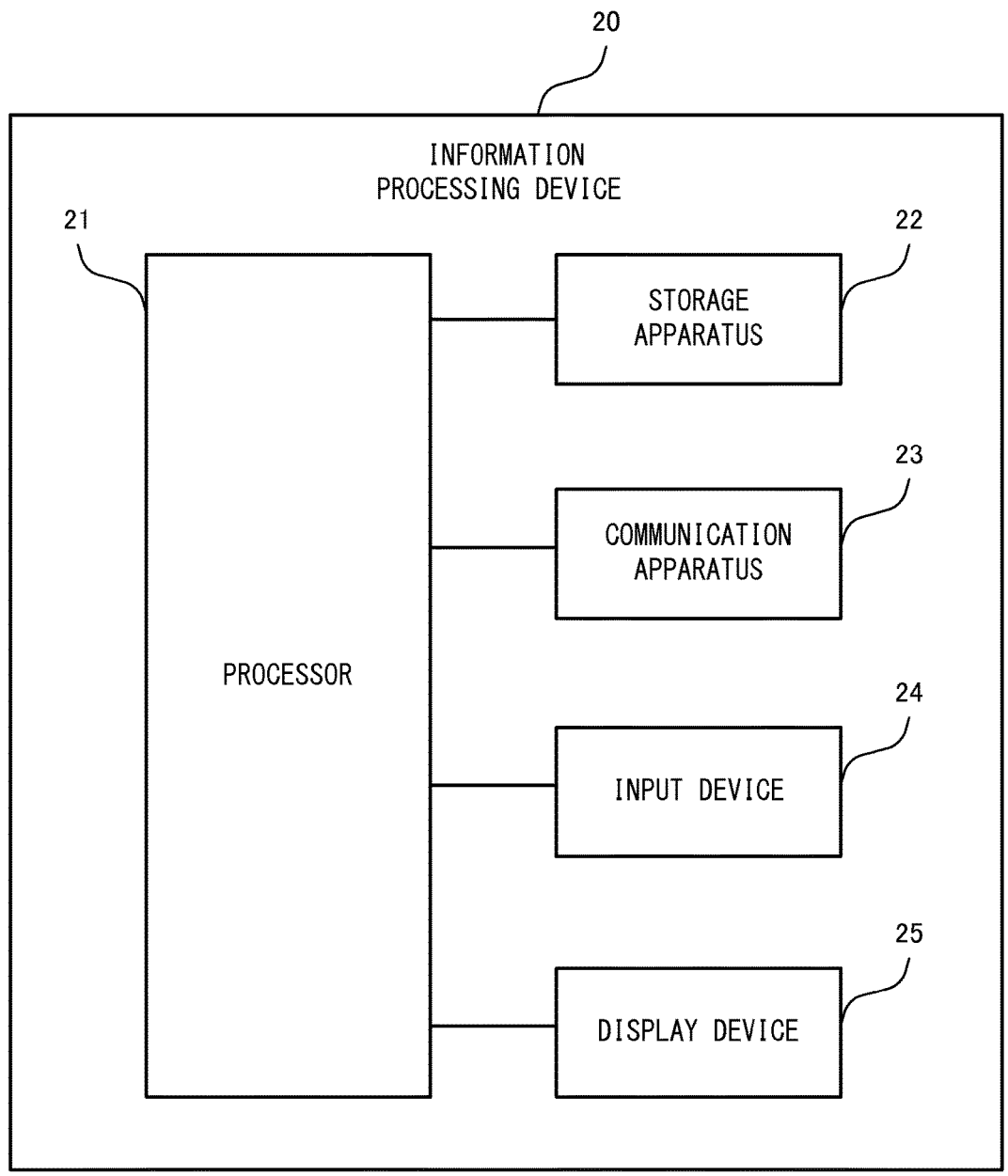
FIG. 2 shows a non-limiting example of an internal configuration of an information processing device.

In FIG. 2, the information processing device 20 includes a processor 21, a storage apparatus 22, a communication apparatus 23, an input device 24, and a display device 25.

In the storage apparatus 22, system software, shop software, and various applications (e.g., game software and the like) are stored. The shop software is software for accessing the shop server 10 and downloading an application and an additional content from the shop server 10.

The processor 21 is able to execute the system software, the shop software, and the various applications stored in the storage apparatus 22, perform a process in accordance with an instruction of the user inputted via the input device 24, and display an image reflecting a result of the process on the display device 25.

The system software, the shop software, and the various applications executed by the processor 21 may be preinstalled in the information processing device 20, may be provided to the information processing device 20 through any computer-readable storage medium such as a CD, a DVD, or the like, or may be provided to the information processing device 20 through communication with another information processing device such as the shop server 10 and the like.

Next, an appearance of the information processing device 20 will be described with reference to FIG. 3.

Figure 3:
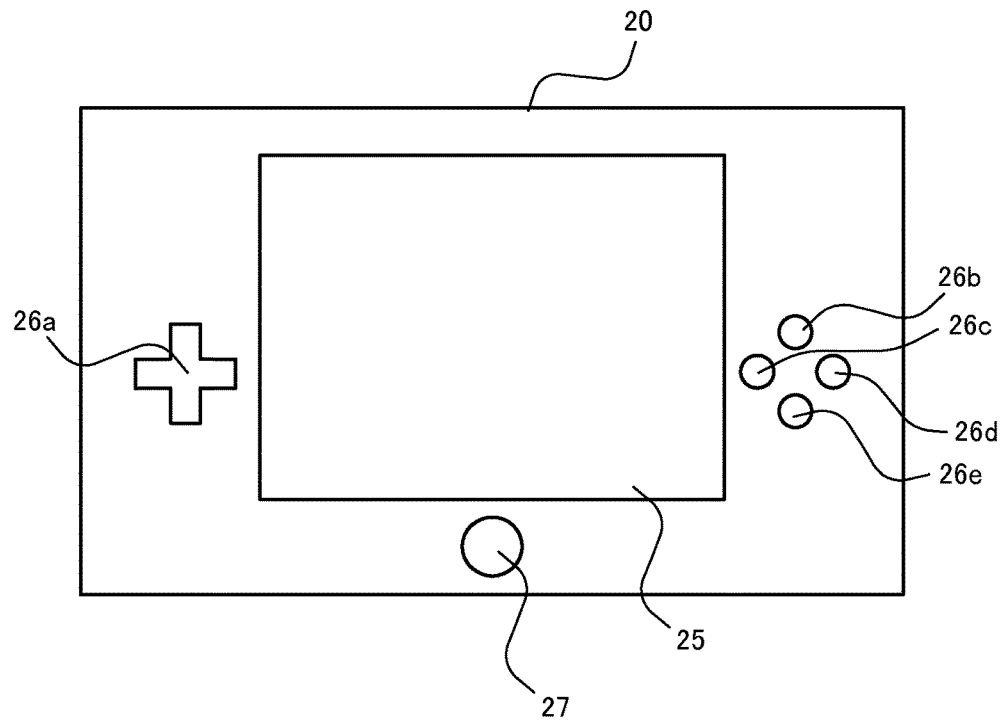
FIG. 3 shows a non-limiting example of an appearance of the information processing device.

In FIG. 3, the information processing device 20 includes the display device 25, operation switches 26a to 26e, and a home button 27. A touch panel is provided on a screen of the display device 25. The operation switches 26a to 26e, the home button 27, and the touch panel are each a part of the input device 24.

Each of the operation switches 26a to 26e has a function which changes depending on an application being executed in the information processing device 20. For example, when a piece of action game software is being executed, the operation switch 26a functions as a switch for causing a character to move while the operation switch 26d functions as a switch for causing the character to jump. When a piece of first-person shooting game software is being executed, the operation switch 26a functions as a switch for moving a shooting aim and the operation switch 26d functions as a switch for firing a bullet.

On the other hand, the home button 27 is a button for displaying a home button menu and functions independent of an application being executed in the information processing device 20. That is, when the user presses the home button 27, the home button menu is displayed regardless of what application is being executed.

Figure 4:
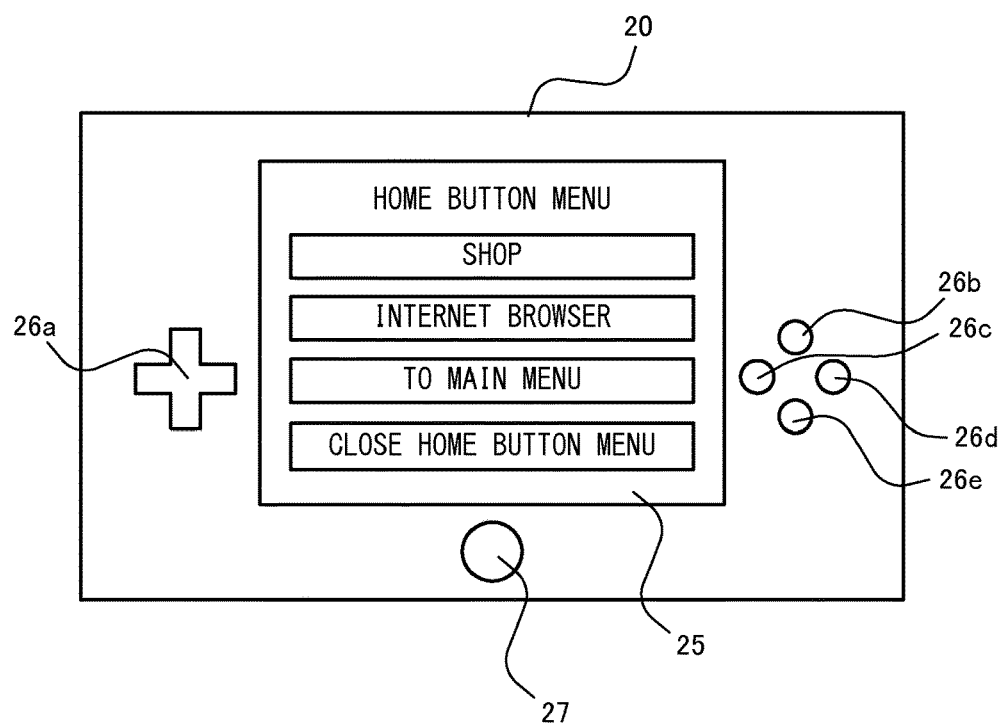
FIG. 4 shows a non-limiting example of a home button menu displayed on a display device.

FIG. 4 shows the home button menu displayed when the home button 27 is pressed. A plurality of options which correspond to different commands, respectively, are displayed on the home button menu. For example, "Shop" in FIG. 4 corresponds to a command for starting the shop software, "Internet Browser" corresponds to a command for starting an internet browser, "To Main Menu" corresponds to a command for displaying a main menu, and "Close Home Button Menu" corresponds to a command for ending display of the home button menu. It should be noted that the main menu is a menu displayed when the information processing device 20 has been started up and a user can start a desired application from a plurality of applications stored in the information processing device 20 through the main menu.

Figure 5:
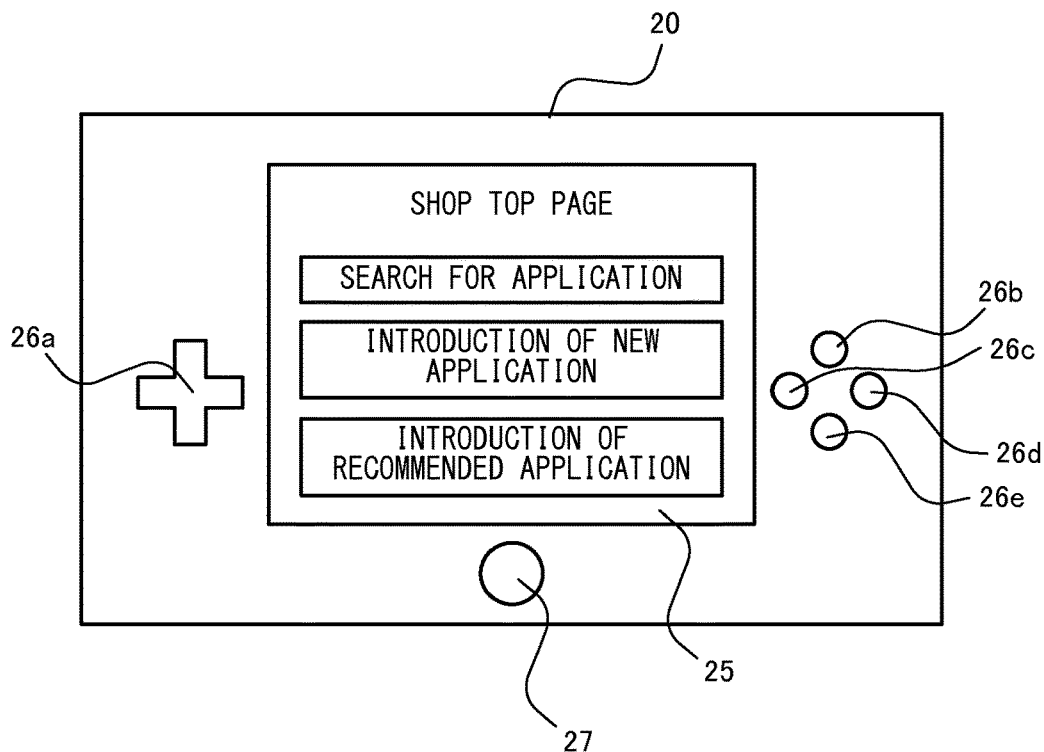
FIG. 5 shows a non-limiting example of a shop top page displayed on the display device.

When the user selects "Shop" in the home button menu shown in FIG. 4, the shop software is started. At this time, when there is no application being executed, "Shop Top Page" as shown in FIG. 5 is displayed. When the user intends to purchase a desired application or an additional content of the application, the user selects "Search for Application" from the shop top page and searches for the desired application. As a method of application search, search by inputting keywords, search by referring to a list of applications arranged under a desired condition (e.g., arranged in alphabetical order, release date, or the like) of the user, and the like can be used.

Figure 6:
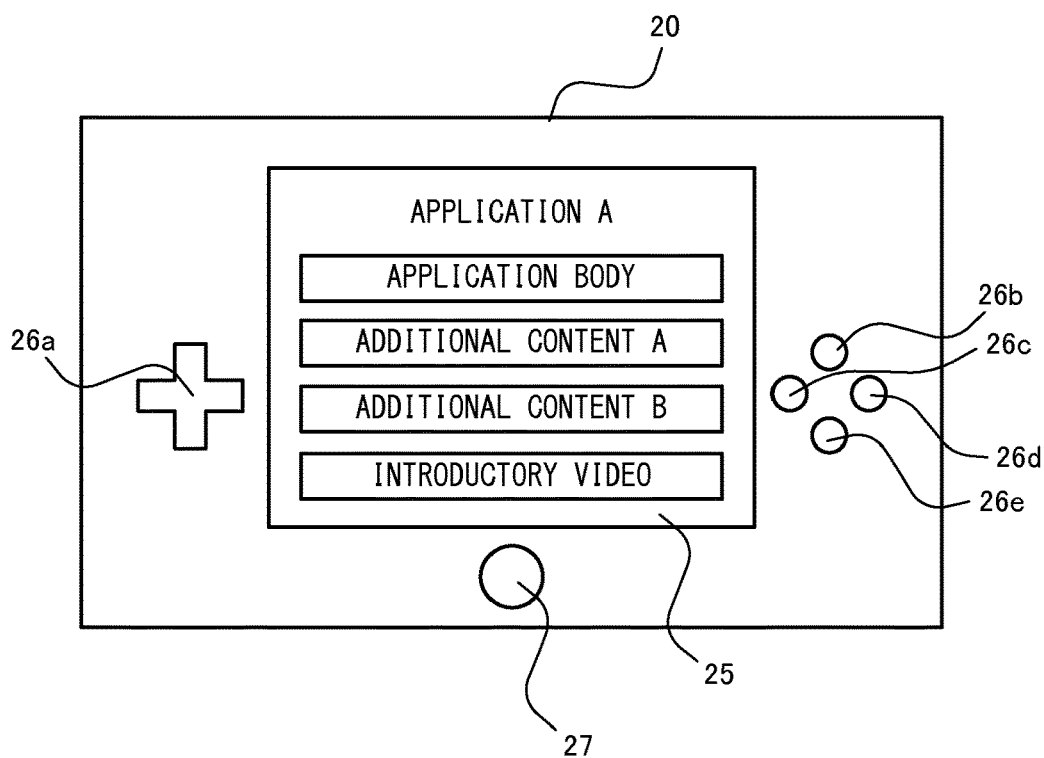
FIG. 6 shows a non-limiting example of a page related to an application displayed on the display device.

For example, when the user searches for "an application A" which is his/her desired application from among a number of applications, a page related to "the application A" is displayed as shown in FIG. 6. On this page, a list of information and various data (programs, additional contents, moving image data, and the like) related to "the application A" is displayed. The user can designate his/her desired data from the various data displayed on this page and download the desired data from the shop server 10. In the example of FIG. 6, "Application Body" which is the program of "the application A", "Additional Content A" and "Additional Content B" each of which is an additional content accessible in "the application A", and "Introductory Video" which is an introductory video (moving image data) of "the application A" are displayed.

The shop top page and the pages related to the respective applications described above are, typically, displayed based on data (e.g., HTML files) received from the shop server 10. The data (e.g., HTML files) for displaying various pages is prestored in the shop server 10 (or may be generated automatically each time when necessary), and in accordance with a request from the information processing device 20, the shop server 10 transmits data corresponding to the requested page to the information processing device 20. The information processing device 20 can specify a desired page from a page group including a plurality of pages which the shop server 10 can provide (for example, by transmitting a URI corresponding to the desired page, and the like), and download data for displaying the desired page from the shop server 10.

The user of the information processing device 20 can cause pages related to various applications to be displayed via the shop top page. That is, the shop top page takes a role as a page for urging the user to select any page from the page group including the plurality of pages (page group for downloading data related to the various applications) which the shop server 10 can provide.

Figure 7:
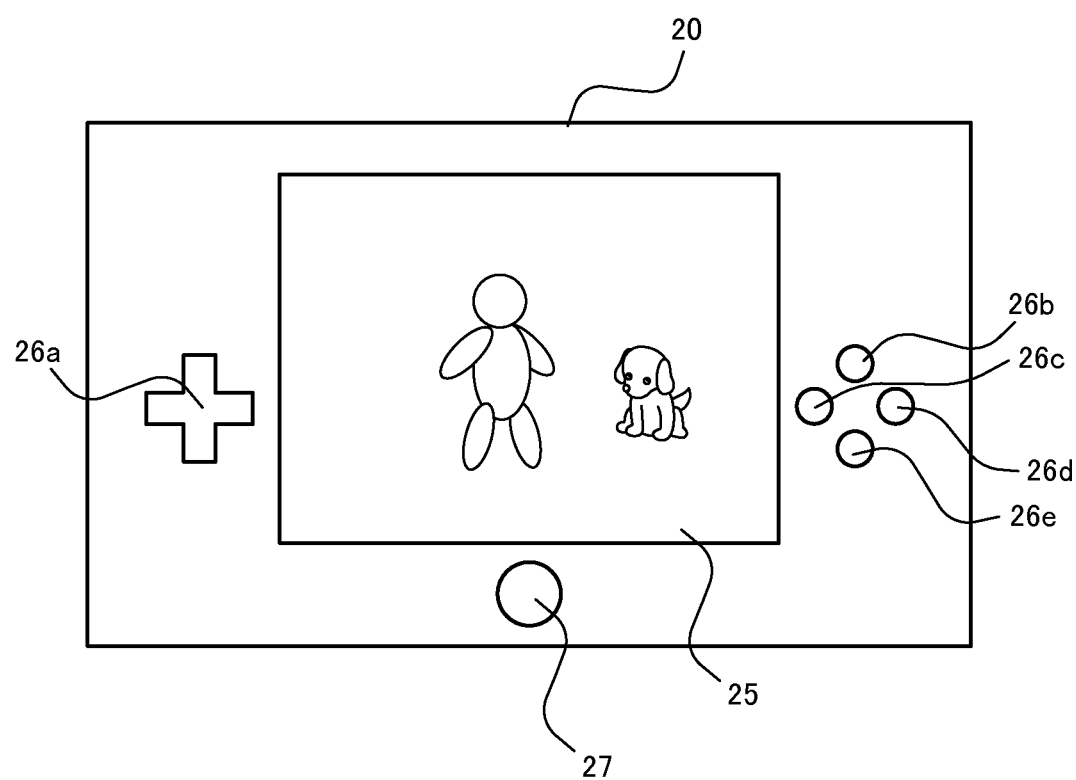
FIG. 7 shows a non-limiting example of a game image displayed on the display device.

As described above, the user can cause the home button menu to be displayed at any timing by pressing the home button 27. For example, when "the application A" is being executed in the information processing device 20, an image (e.g., a game image) of "the application A" is displayed on the display device 25 as shown in FIG. 7, and the user can perform an input operation (e.g., an operation of a player character, and the like) with respect to "the application A" by operating the operation switches 26a to 26e. Execution of "the application A" is suspended when the user presses the home button 27 while the "application A" is being executed, and the home button menu shown in FIG. 4 is displayed on the display device 25. Then, for example, when "Close Home Button Menu" is selected from the home button menu of FIG. 4 and thereby display of the home button menu is ended, the execution of "the application A" having been suspended is resumed.

It should be noted that when the user wishes to download an additional content of "the application A" from the shop server 10 while "the application A" is being executed, the user presses the home button 27 to cause the home button menu to be displayed and selects "Shop". In this case, the page related to "the application A" as shown in FIG. 6 is automatically displayed instead of the shop top page as shown in FIG. 5. As will be described later in detail, this is realized by the shop software obtaining identification information of an active application via the system software, and, in accordance with the obtained identification information, automatically obtaining data of the page related to the corresponding application from the shop server 10. Accordingly, the user need not bother to search for "the application A" from the shop top page and the user can easily download an additional content and the like related to the active application from the shop server 10.

It should be noted that, after download of the desired additional content has been started, the execution of the application having been suspended is resumed automatically or based on an instruction of the user. When the additional content has a large data size, the download process of the additional content may be performed in parallel with the execution of the application having been resumed. By doing so, the user need not suspend the execution of the application for a long time even when an additional content having a large data size is downloaded and used, which is convenient for the user.

Figure 8:
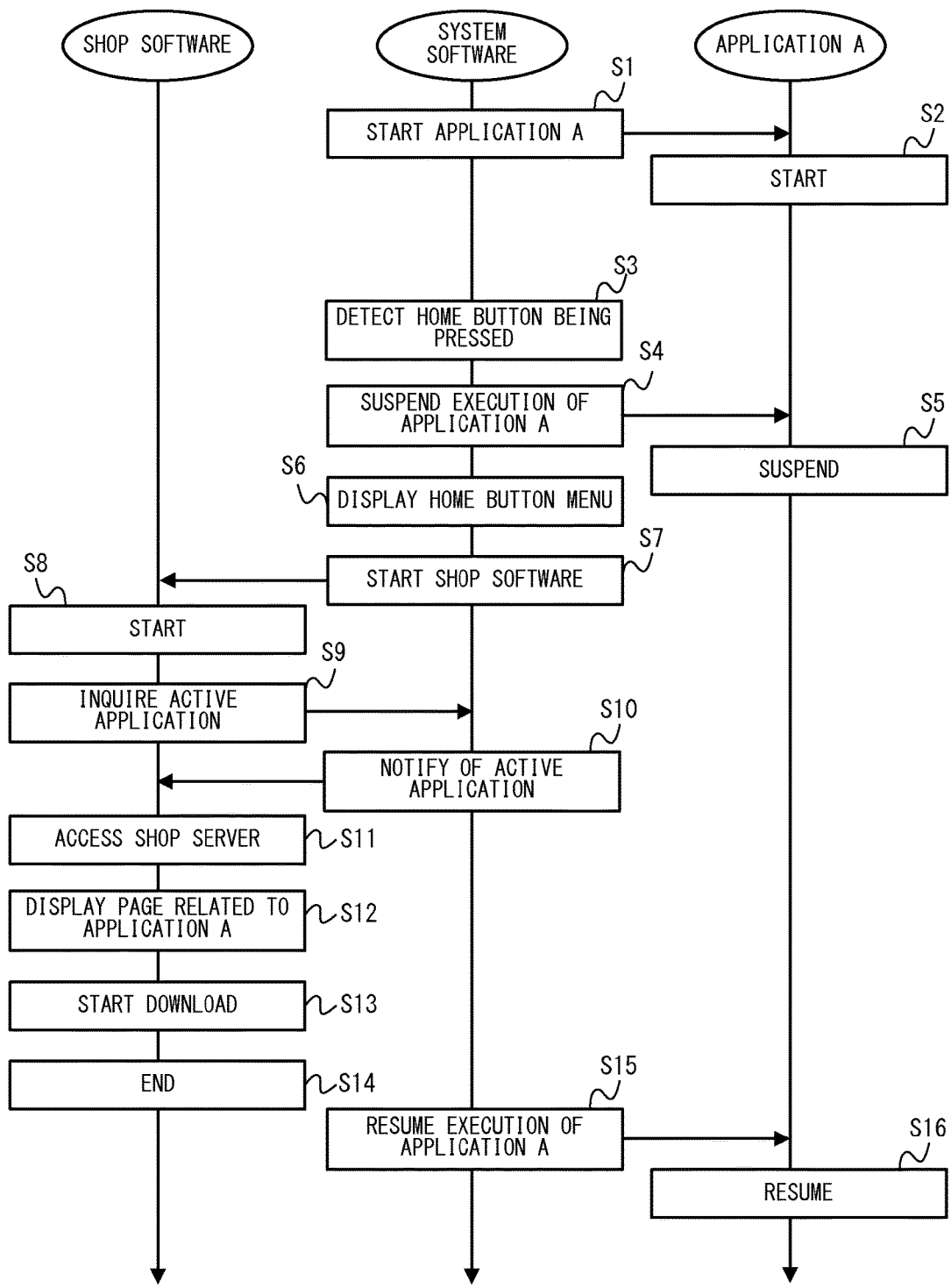
FIG. 8 shows a non-limiting example of an operational flow of the information processing device.

Next, an operation of the information processing device 20 will be described with reference to FIG. 8. It should be noted that processes of the shop software, the system software, and the application A shown in FIG. 8 are processes executed by the processor 21 based on these pieces of software.

When an instruction to start "the application A" has been inputted by the user via the main menu or the like, the system software (more strictly speaking, the processor 21 which operates in accordance with the system software) starts "the application A" stored in the storage apparatus 22.

Then, upon detecting that the home button 27 is pressed while "the application A" is being executed, the system software suspends the execution of "the application A", and displays the home button menu on the display device 25.

Then, upon detecting that "Shop" is selected from the home button menu by the user, the system software starts the shop software stored in the storage apparatus 22.

Upon start of the shop software, the shop software (more strictly speaking, the processor 21 which operates in accordance with the shop software) inquires an active application (including an application whose execution is being suspended) of the system software. The inquiry is made by, for example, calling up a function (of obtaining application identification information of an active application) of the system software by means of an API.

Upon receiving the inquiry from the shop software, the system software obtains application identification information of the active application and notifies the shop software of the active application. When there is no active application, the system software notifies the shop software accordingly. The application identification information is obtained by, for example, reading out a data file that includes the application identification information of the application, the data file being stored in the storage apparatus 22 together with the application.

Based on the application identification information notified by the system software, the shop software accesses the shop server 10 and displays a page related to the active application (here, "the application A") on the display device 25. Specifically, for example, the shop software specifies a URI of a page which corresponds to the application identification information notified by the system software, and transmits the URI to the shop server 10. In another exemplary embodiment, the shop software may transmit the application identification information notified by the system software to the shop server 10 and specifies, in the shop server 10, the page which corresponds to the application identification information Then, based on an instruction of the user inputted via the input device 24, the shop software starts a download process for downloading an additional content which is accessible in the active application from the shop server 10. The download process is performed by the system software. Then, execution of the shop software is ended automatically or based on an instruction of the user.

When the execution of the shop software has been ended, the system software resumes the execution of "the application A" having been suspended.

The system software performs the download process of the additional content in parallel with the execution of "the application A" having been resumed. For example, the download process of the additional content may be performed in the background while "the application A" is being executed (that is, in a mode where the user does not recognize that the download process is being performed).

Thus, according to the exemplary embodiment, by simply selecting "Shop" from the home button menu while a certain application is being executed, a user can easily display a page (page for downloading an additional content, and the like) related to the active application. Consequently, while the certain application is being executed, the user can easily download an additional content and the like related to the application from the shop server 10. In addition, the time taken to display the page related to the active application can be reduced.

Further, according to the exemplary embodiment, the page related to the active application is displayed by the shop software, and thus there is no need to incorporate the function of displaying a page for downloading additional contents and the like to each application (e.g., "the application A"). Consequently, such a function can be realized regardless of type of the application. In addition, such a function can be realized without time and effort of the application's programmer.

(Modification)

In the above exemplary embodiment, the information processing device shown in FIG. 2 has been described. However, the present technology is not limited thereto, and any information processing device or information processing system can be used. For example, instead of a hand-held information processing device 20 such as the information processing device 20 shown in FIG. 2, a stationary information processing device 20 may be used. Further, the information processing device 20 need not include all of the storage apparatus 22, the communication apparatus 23, the input device 24, and the display device 25. The storage apparatus 22, the communication apparatus 23, the input device 24, and the display device 25 which are externally provided may be used.

Figure 9:
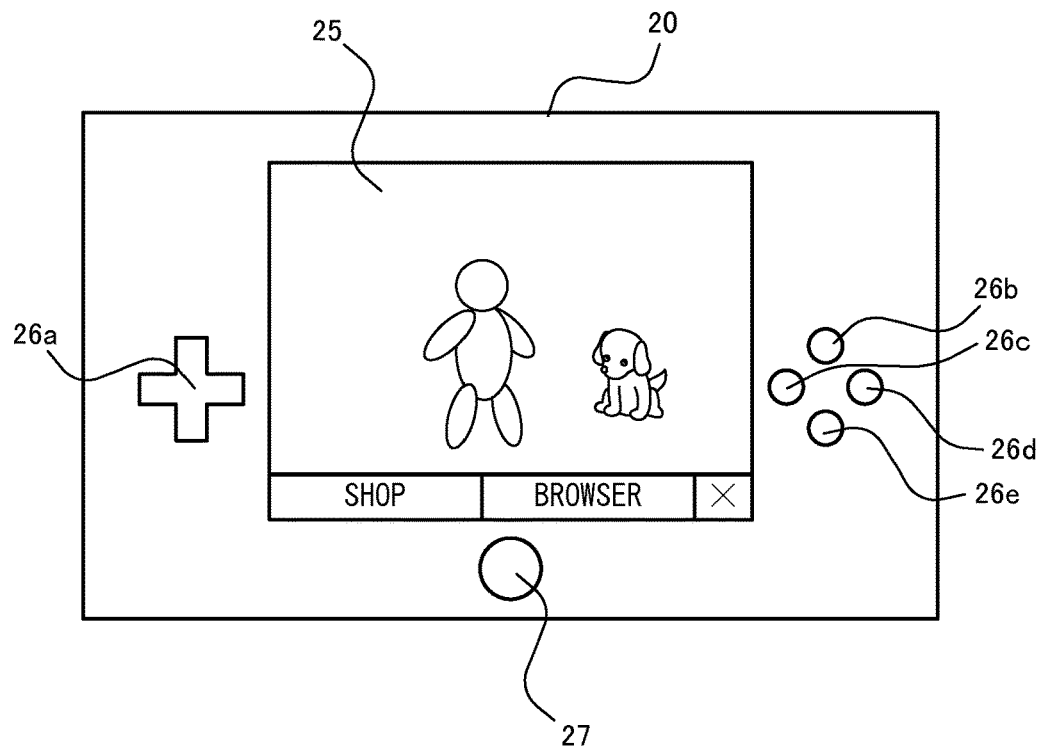
FIG. 9 is shows a non-limiting example of a modification of the home button menu displayed on the display device.

Further, in the above exemplary embodiment, when the home button 27 is pressed while the application is being executed, the home button menu is displayed full screen on the display device 25. However, in another exemplary embodiment, as shown in FIG. 9, the home button menu may be displayed on a part of the screen. Further, in another exemplary embodiment, when the information processing device is capable of displaying an image on a plurality of display devices, the information processing device may display the home button menu on a second display device while displaying an image of an application on a first display device.

Further, in the above exemplary embodiment, when the home button 27 is pressed while the application is being executed, the execution of the application is suspended. However, in another exemplary embodiment, the execution of the application may be maintained even if the home button 27 is pressed. For example, when the home button 27 is pressed while music is being reproduced by a music application, display of the home button menu and download of an additional content may be performed while a music reproduction process by the music application is maintained.

Further, in the above exemplary embodiment, when the home button 27 is pressed while the application is being executed, the home button menu is displayed and the shop software is started in response to "Shop" having been selected from the home button menu. However, in another exemplary embodiment, the shop software may be automatically started in response to the home button 27 having been pressed while the application is being executed.

Further, in the above exemplary embodiment, when the home button 27 is pressed while the application is being executed, the home button menu is displayed. However, in another exemplary embodiment, the home button menu may be displayed by means of, instead of the home button 27, a particular input operation (e.g., simultaneous pressing of some of the operation switches 26b to 26e, a predetermined gesture input on the touch panel, and the like) which is not used for the operation of the application.

Further, in the above exemplary embodiment, a case where there is only one application ("the application A") which is being executed (or being suspended) has been described. However, an information processing device which can execute a plurality of applications in parallel may be used. In this case, the shop software may display a page related to one of a plurality of active applications, or display pages related to all of the respective active applications. In the case of displaying a page related to one of the plurality of active applications, for example, a page related to an application which the user has most recently used (that is, an application which has most recently received an input operation from the operation buttons 26a to 26e) from among the plurality of active applications may be displayed. Alternatively, the user may select a desired application from among the plurality of active applications and a page related to the selected application may be displayed.

Figure 10:
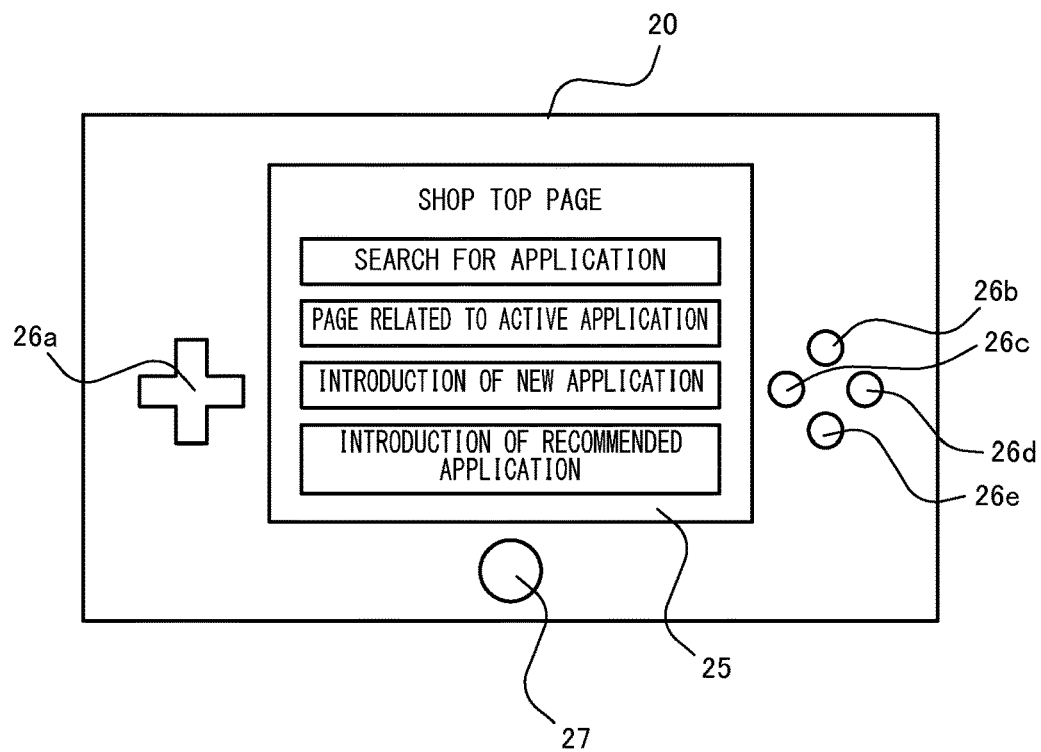
FIG. 10 is shows a non-limiting example of a modification of the shop top page displayed on the display device.

Further, in the above exemplary embodiment, a page related to an active application is automatically displayed when the shop software has been started. However, in another exemplary embodiment, a page related to an active application may be displayed at a timing of an instruction of the user after the shop software is started. For example, as shown in FIG. 10, a page related to an active application may be displayed in response to "Page Related to Active Application" having been selected from the shop top page by the user.

Further, in the above exemplary embodiment, the shop software and the system software are independent of each other. However, in another exemplary embodiment, the function of the shop software may be incorporated in the system software.

Further, the processes performed by the information processing device 20 in the above exemplary embodiment may be performed by any information processing system. For example, instead of the information processing device 20, an information processing system including a plurality of processors may be used and the processes may be performed by the plurality of processors. The plurality of processors may be provided in a single information processing device or may be provided in different respective information processing devices.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
a display; and
processing circuitry, comprising at least one processor, the processing circuitry coupled to the display and being at least configured to:
  execute various applications;
  access a network service for downloading application related data of each of the various applications, the network service providing for selective downloading of one or more items of application related data for each of the various applications by providing a page group including a plurality of pages, for downloading the one or more items of application related data, corresponding to the various applications, respectively, and a selection page for selecting a desired page from the page group including the plurality of pages;
  responsive to receiving a predetermined user input during execution of an application of the various applications by the processing circuitry, (1) suspend execution of the application, (2) obtain active application identification information representing the application suspended by the processing circuitry, (3) access the network service to retrieve, based on the obtained active application identification information, a page, from the page group including the plurality of pages, including information about one or more items of application related data that are associated with the obtained active application identification information, and (4) automatically display the retrieved page for downloading the one or more items of application related data that are associated with the obtained active application identification information; and
  responsive to receiving the predetermined user input when none of the various applications are being executed by the processing circuitry, access the network service to retrieve the selection page for selecting one or more pages of the page group with items of application related data that are associated with the various applications, display the selection page on the display, select, based on a user input, a page from the page group including the plurality of pages on the displayed selection page, and display the selected page from the page group on the display,
wherein the automatically displayed retrieved page for downloading the one or more items of application related data associated with the obtained active application identification information is the same page that is capable of being selected from the selection page based on a user input.

2. The information processing system according to claim 1, wherein the network service is accessed regardless of type of the application being executed or being suspended by the processing circuitry.

3. The information processing system according to claim 1, comprising an information processing device which operates in accordance with system software, wherein
a function provided by the system software is used to obtain the active application identification information.

4. The information processing system according to claim 1, wherein the processing circuitry is further configured to specify, based on the obtained active application identification information, the page for downloading the application related data of the application represented by the identification information from the network service.

5. The information processing system according to claim 4, wherein when the network service is accessed, the active application identification information is obtained and the specified page is displayed.

6. The information processing system according to claim 1, the processing circuitry is further configured to resumes the execution of the application by the processing circuitry when a predetermined condition is satisfied.

7. The information processing system according to claim 6, wherein
the predetermined user input is an operation for displaying a menu screen which includes a command for accessing the network service, and
the network service is accessed when the access command has been issued by the user from the menu screen.

8. The information processing system according to claim 6, wherein the predetermined user input is an operation which is received regardless of type of the application executed by the processing circuitry.

9. The information processing system according to claim 6, wherein the predetermined user input is an operation which is not used for the execution of the application by the processing circuitry.

10. The information processing system according to claim 1, wherein when displaying the retrieved page or the selected page is ended while the application is suspended, execution of the application is resumed.

11. The information processing system according to claim 1, wherein the processing circuitry is further configured to download, from the network service, the application related data designated by a user from the displayed automatically retrieved page or the selected page.

12. The information processing system according to claim 11, wherein the application related data is downloaded, from the network service, in parallel with execution of the application.

13. An information processing device comprising a processing system, comprising at least one processor, the processing system being at least configured to:
  execute various applications;
  access a network service for downloading application related data of each of the various applications, the network service providing for selective downloading of one or more items of application related data for each of the various applications by providing a page group including a plurality of pages, for downloading the one or more items of application related data, corresponding to the various applications, respectively, and a selection page for selecting a desired page from the page group including the plurality of pages;

responsive to receiving a predetermined user input during execution of an application of the various applications by the processing system, (1) suspend execution of the application, (2) obtain active application identification information representing the application being suspended by the processing system, (3) access the network service to retrieve, based on the obtained active application identification information, a page, from the page group including the plurality of pages, including information about one or more items of application related data that are associated with the obtained active application identification information, and (4) automatically display, on a display, the retrieved page for downloading the one or more items of application related data that are associated with the obtained active application identification information; and responsive to receiving the predetermined user input when none of the various applications are being executed by the processing system, access the network service to retrieve the selection page for selecting one or more pages of the page group with items of application related data that are associated with the various applications; display the selection page on the display, select, based on a user input, a page from the page group including the plurality of pages on the displayed selection page, and display the selected page from the page group on the display, wherein the automatically displayed retrieved page for downloading the one or more items of application related data associated with the obtained active application identification information is the same page that is capable of being selected from the selection page based on a user input.

14. A computer-readable non-transitory storage medium having stored therein a computer program which, when executed, causes a computer of an information processing system to:

access a network service for downloading application related data of each of various applications, the network service providing for selective downloading of one or more items of application related data for various applications by providing a page group including a plurality of pages, for downloading the one or more items of application related data, corresponding to the various applications, respectively, and a selection page for selecting a desired page from the page group including the plurality of pages;

responsive to receiving a predetermined user input during execution of an application of the various applications by the processing system, (1) suspend execution of the application, (2) obtain active application identification information representing the application suspended by the information processing system, (3) access the network service to retrieve, based on the obtained active application identification information, a page, from the page group including the plurality of pages, including information about one or more items of application related data that are associated with the obtained active application identification information, and (4) automatically display the retrieved page for downloading the one or more items of application related data that are associated with the obtained active application identification information; and responsive to receiving the predetermined user input when none of the various applications are being executed by the processing system, access the network service to retrieve the selection page for selecting one or more pages of the page group with items of application related data that are associated with the various applications, display the selection page on the display, select, based on a user input, a page from the page group including the plurality of pages on the displayed selection page, and display the selected page from the page group on the display, wherein the automatically displayed retrieved page for downloading the one or more items of application related data associated with the obtained active application identification information is the same page that is capable of being selected from the selection page based on a user input.

15. The information processing device according to claim 13, wherein the displayed retrieved page or the selected page displays a downloadable media file associated with the application being suspended by the processing system.

16. The information processing device according to claim 13, wherein the displayed retrieved page or the selected page displays downloadable additional character data or additional stage data used in the application being suspended by the processing system.

17. An information processing device comprising a processing system, including at least one processor, the processing system being at least configured to:

when a particular operation by a user is received during execution of an application of a plurality of applications by the processing system:
suspend execution of the application by the processing system in response to detection of the particular operation by the user;
obtain application identification information representing the application being suspended by the processing system in response to the detection of the particular operation by the user;
based on the obtained application identification information, automatically access, from a network service providing downloadable application related data for the plurality of applications, a page for downloading the application related data for the application being suspended by the processing system in response to the detection of the particular operation by the user; and
display the accessed page for downloading the application related data for the application being suspended by the processing system in response to the detection of the particular operation by the user; and in response to a user selection of application related data included in the displayed page, download the application related data for the application being suspended by the processing system; and resume the execution of the application by the processing system when a predetermined condition is satisfied, wherein the application related data is downloaded during the resumed execution of the application by the processing system.

18. The information processing device according to claim 17, wherein the downloadable application related data includes a media file associated with the application being suspended by the processing system.

19. The information processing device according to claim 17, wherein the application being suspended by the processing system is a game application and the downloadable application related data includes additional character data or additional stage data used in the game application being suspended by the processing system.

20. The information processing device according to claim 17, wherein the processing system is further configured to receive a download request specifying an item on the displayed page with the downloadable application related data, download the specified item, and when the downloading of the specified item is started, automatically resumes the execution of the suspended application while the specified item is being downloaded.

21. The information processing device according to claim 17, wherein when the particular operation is received, a plurality of application executed by the processing system are suspended, and the processing system is further configured to:

obtain application identification information for the plurality of application being suspended;

automatically access from the network service, based on the obtained application identification information, a plurality of pages for downloading the application related data, each page corresponding to a respective application being suspended; and display a page, from the accessed plurality of pages, corresponding to an application, from the plurality of applications, which most recently received an input operation from an input device.

22. The information processing device according to claim 17, wherein when the particular operation by the user is received with no applications of the plurality of applications being executed by the processing system:

access, from the network service providing downloadable application related data for various applications, a selection page for finding a page from a plurality of pages including downloadable application related data for the various applications; and display the selection page.

* * * * *